H. G. KRAUSS.
MACHINE TOOL.
APPLICATION FILED MAY 18, 1917.
1,344,236.
Patented June 22, 1920.
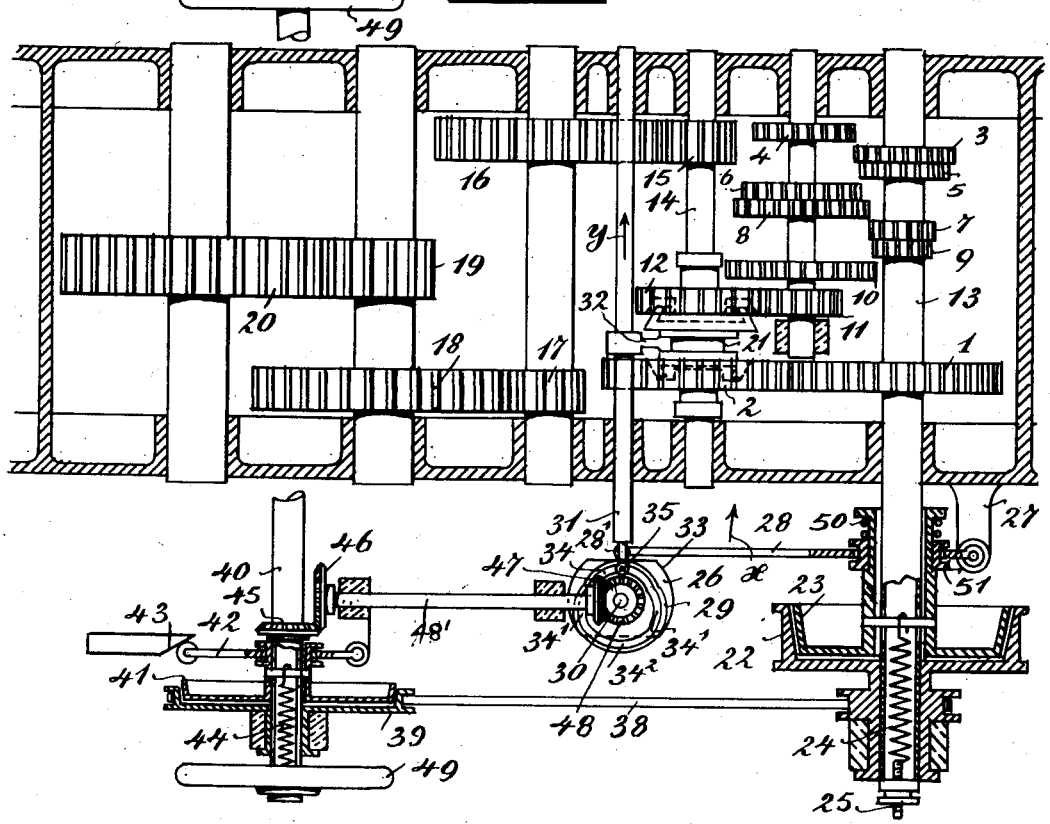
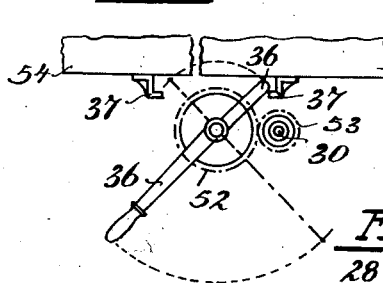
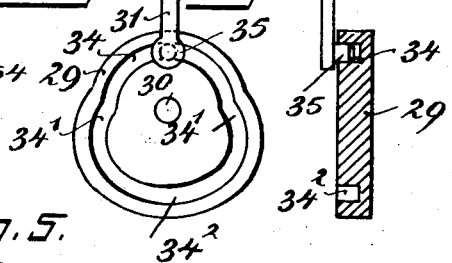
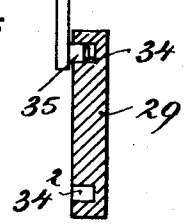
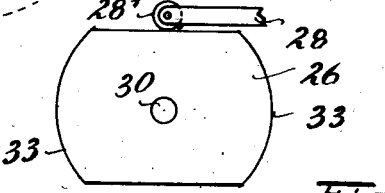
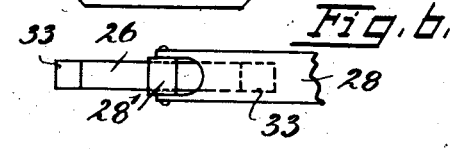
Inventor
Hans Georg Krauss
by Ottomun
his Attorney

UNITED STATES PATENT OFFICE.

HANS GEORG KRAUSS, OF MUNICH, GERMANY.

MACHINE-TOOL.

1,344,236.   Specification of Letters Patent.   Patented June 22, 1920.

Application filed May 18, 1917. Serial No. 169,401.

*To all whom it may concern:*

Be it known that I, HANS GEORG KRAUSS, citizen of Germany, residing at Munich, Bavaria, Germany, have invented certain new and useful Improvements in Machine-Tools; and I do hereby declare the following to be a full, clear, and exact description of the invention, such as will enable others skilled in the art to which it appertains to make and use the same.

My invention relates to improvements in machine tools and refers more particularly to new features in reciprocating mechanism, as employed in planers and other machines and the object of my invention is to provide a mechanism of the class referred to permitting of the reversal of the reciprocating parts without changing the direction of the driving motion or interrupting the rotation of the driving pulley and to accomplish this by means, which operate simply, accurately, and automatically and with but little wear of the machine parts.

In describing my said invention I refer to the drawing herewith in which—

Figure 1 is a top plan view with parts in section of a planer embodying my invention; Fig. 2 is a fragmentary detail view of modified means for rotating the shaft 30 upon which the cams 26 and 29 are mounted; Fig. 3 is an elevational view and Fig. 4 a sectional view of the cam 29; Fig. 5 is an elevational view and Fig. 6 an edge view of the cam 26.

In practising my invention I cause the reciprocating parts of a machine, such as the reciprocating table of a planer, to automatically act at the end of its movement in either direction against a lever or the like and by the movement of the lever to disconnect the driving member of the machine from the driving shaft and also from the transmission gear and the moving parts, this being done by means such as cam guides acting successively at predetermined intervals, the direction of movement of the driving member remaining unchanged; thereupon I cause the transmission-gear to move in the opposite direction, the driving member being again connected with the driving-shaft and with the transmission gear and the moving parts.

The movement of the lever may be either directly used for moving the cam guides, or the movement of the latter may be derived from the driving member by connecting it with a transmission pulley and using the lever to temporarily connect the same with an intermediate gear which in turn during the reversal movement transfers the movement of the driving pulley to the cam guides. This last mentioned way has the advantage that it permits of the reversal being effected at a precisely predetermined time and in a precisely predetermined place.

The mechanism, as shown in the drawing, consists essentially of the main gear-wheels 1 and 2 causing an accelerated return-movement of the planer table and of a series of gear-wheels 3 and 4, 5 and 6, 7 and 8, 9 and 10 of various diameters causing the advance movements at various speeds, any of said pairs of gear wheels being used at the operator's discretion, as the speed of the intended advance movement may require, the said gears transferring through another pair of gear-wheels 11 and 12 the movement of the driving shaft 13 to the shaft 14, just as the pair 1 and 2 does, but in the opposite direction. From the said shaft 14 the movement at a lower speed will be transferred by means of the gears 15 and 16, 17 and 18, 19 and 20, to a rack attached to the lower side of the planer-table (not shown on the drawing) and engaging the gear-wheel 20, and therewith to the reciprocating parts. The shaft 14 carries loosely the toothed wheels 2 and 12, in which are inserted clutch members which by means of a coupling-box 21 enable the gear 2 to be connected to shaft 14 for the return movement, and the gear 12 to be connected to shaft 14 for the advance movement of the table. The driving-shaft 13 carries, loosely, the driving-pulley 22. The latter is engageable by a concentric friction-pulley 23 by means of which the driving pulley 22 may be connected with the driving-shaft for the movement of the planer-table. The said friction-pulley 23 is under the action of an elastic body, such as a spring 24, which tends to move the friction pulley 23 into engaging position with the driving pulley 22 and should be of such predetermined tension that when a certain resistance of the machine-tool is exceeded the driving pulley will slip on the friction-pulley. To determine the amount or degree of such resistance the spring 24 may be provided with a suitable adjusting contrivance 25.

During the movement of the planer table in either direction the friction-wheel 23 remains in engagement with said driving-pulley. At the end of each movement a cam 26 will cause disengagement of the member 23 from the member 22 by any suitable contrivance, the drawing showing, by way of example, a rotatably supported lever 28, swinging on a bracket 27, and said members 22 and 23 will be reëngaged after the return-movement of the coupling-box 21. This return-movement of the coupling-box 21 will be effected by a second guide cam 29, mounted together with the afore-mentioned cam 26 on the same shaft 30 and within operative reach of a bar 31 carrying an arm 32 for moving the coupling-box 21 to clutch either the gear 2 or the gear 12 to the shaft 14. The said cams have cam paths 33 and 34, each preferably comprising integral halves of equal shape and size, forming a symmetrical plate or disk so that during one complete revolution of the cams, each will twice perform the same work, their curvature and arrangement in relation to each other being such that they will act in succession, so that, for instance, at the end of the return-movement in the position of the parts, as shown on the drawing, after a semi-revolution of the cams 26 and 29 to the right or to the left, first the flat portion of the cam 33 which is nearest to the lever 28 will bear against the roller 28′ and accordingly move the said lever 28 in the direction indicated in the drawing by the arrow $x$, thereby causing the disengagement of the friction-pulley 23 from the driving-pulley 22 which is driven from the driving-shaft 13 in the same direction as the latter. During this disengaging movement of the lever 28 the end of bar 31 guided in the adjoining concentric portion of the cam 34 is not operated, and the coupling-box 21 is not moved during the disengagement of the friction-pulley 23. When the disengagement of the friction-pulley 23 has been completed, the lever 28 engages one of the curved portions of the cam 33 and thus remains temporarily in opposition to the action of spring 24 and in its disengaging position. The guide roller 35 of the bar 31, however, leaves the concentric portion of the curve 34 and enters another guide curve 34′ which leads to another concentric guide portion 34$^2$ of larger diameter. This portion 34$^2$ moves the bar 31 in the direction indicated in the drawing by the arrow $y$ and the coupling-box 21 will by this movement be released from its connection with the gear 2 and engage the wheel 12, clutching the latter to the shaft 14, so that after the reëngagement of the friction-pulley 23 with the pulley 22, the movement of the driving shaft will be transmitted by the engaged pair of gears of the speed-changing gears 3 to 10, acting through the medium of gear-wheels 11 and 12 upon the gear-wheel 20 to effect an advance movement of the planer table. The friction-pulley 23 will be reëngaged with the pulley 22 after the coupling of the toothed wheel 12 to the shaft 14 has been effected by means of the coupling-box 21, and after the roller 35 of the bar 31 has passed a portion 34$^1$ and reached the concentric portion 34$^2$ next thereto. By this time a curved portion of the cam 33 has passed away from beneath the lever 28 and the latter moves under the action of spring 24 against the next succeeding flat portion of the cam 33 in a direction opposite to that indicated in the drawing by the arrow $x$ and the driving-pulley 22 is thus engaged again with the driving-shaft 13. The cams 26 and 29 have now completed a semi-revolution and remain at rest until the completion of the advance movement. When the latter has been completed the same course as above described will be repeated, with the difference, however, that this time the roller 35 of the bar 31 will by this action of the curve portion 34$^1$ be guided back and inward from the concentric curve-portion 34$^2$ of the larger diameter to the concentric curve-portion 34$^1$ of the smaller diameter and thus cause the bar 31 to move in opposition to the direction of the arrow $y$ and cause the coupling-box 21 to couple the gear-wheel 2 to shaft 14. Thus the reversal of the gear from return movement to advance movement and vice versa will always be effected while the driving shaft is under no load but under the action of the live power still prevailing in the moving parts, such power being reduced to zero slowly and in a gear-saving way by the spring 24 or whatever may be substituted for it to effect engagement between the driving pulley and the driving shaft, accomplishing this engagement in one gradual, elastic and yielding horizontal movement and permitting the parts to slide when a predetermined resistance is exceeded.

The cams 26 and 29 may be directly operated, as shown in Fig. 2, by an adjusting lever or cam 36 mounted on the shaft 30 and being operated in the end or reversing positions of the table by a bracket 37 of any suitable shape and which brackets are preferably adjustably attached to or mounted on the desired reciprocating part of the mechanism.

Instead of this direct operation, as described, the same might be indirect, being effected, as shown in Fig. 1, from the driving pulley 22. For this purpose an endless belt 38 or similar device connects the pulley 22 with a motion-transmitting pulley 39, loosely carried on a shaft 40 and connectible with the same by a coupling 41. This coupling 41 may be disposed so as to be under the action of a lever 42 which may at the place where the reverse or return movement of the reciprocating parts begins be brought into engaging position by a reciprocating member 43 which may also be adjustable. The engagement of the coupling member 41 may be effected in opposition to a disengaging spring 44 or its equivalent. The movement imparted to the shaft 40 will be transmitted from the same to the shaft 30 of the cams by the medium of conical or mitergears 45 and 46, and 47 and 48, and of the shaft 48'.

When by the operation of the cams 26 and 29 the reversal has been effected in the way described and the parts begin to move in the opposite direction the pawl 43, following them, will again release the engaging lever 42 whereupon the disengaging spring 44 will again disengage the coupling and interrupt the movement of the cams.

To arrest the reciprocating parts, such as the working table of a planer, or to adjust such table or parts to a particular working place, the shaft 30 may be operated directly by hand or from the shaft 40 which may for the purpose be provided with a handwheel 49. To facilitate adjustment of the pulley 23 the disengaging lever 28 may be caused to act upon a sleeve 51 under the action of spring 50, so that the friction-pulley 23 will not follow the disengaging lever until the tension of the spring 50 has reached a certain strength.

Various changes in the form and minor details of construction may be resorted to without departing from the spirit and scope of my invention.

What I claim is:

1. In mechanism of the character described, the combination with a reciprocatory member, of separate gearing for moving the same in opposite directions including a driving shaft adapted to rotate in but one direction, driving means for imparting rotary motion to said shaft, means for periodically causing reversal of direction of motion of said reciprocatory member, and means for disengaging said driving means from said driving shaft and holding it out of engagement during such reversal.

2. In mechanism of the character described, the combination with a reciprocatory member, of separate gearing for moving the same in opposite directions including a driving shaft adapted to rotate in but one direction, driving means for imparting rotary motion to said shaft, and means including a plurality of cams for successively disengaging said driving means from said driving shaft, causing reversal of direction of said reciprocatory member during such disengagement, and causing reëngagement of said driving means with said driving shaft.

3. In mechanism of the character described, the combination with a reciprocatory member, of gearing for moving the same in one direction and additional gearing for moving it in the opposite direction, a driving shaft adapted to rotate in but one direction, driving means for imparting rotary motion to said shaft, means operable when said reciprocatory member reaches the end of its travel in either direction to disconnect one set of gearing from said driving shaft and connect the other set thereto to reverse the direction of movement of said reciprocatory member, and means for disengaging the driving means from the driving shaft and holding it out of engagement during such disconnection and connection of gears.

4. In mechanism of the character described, the combination with a reciprocatory member, of change speed gearing for moving said member in one direction at selective speeds, additional gearing for moving said member in the opposite direction at a single speed, a driving shaft adapted to rotate in but one direction, means for connecting any set of said change speed gearing or said additional gear to said driving shaft, driving means for imparting rotary motion to said driving shaft, and means for disengaging the driving means from the driving shaft and holding it out of engagement during such disconnection and connection of gears.

5. In mechanism of the character described, the combination with a reciprocatory member, of gearing for moving the same in one direction and additional gearing for moving it in the opposite direction, a driving shaft adapted to rotate in but one direction, a clutch for connecting either of said gearings with said driving shaft, means for actuating said clutch when said reciprocatory member has reached the end of its travel in either direction, driving means for imparting rotary motion to said driving shaft, and means whereby said driving means is kept out of engagement with said driving shaft during actuation of said clutch.

6. In mechanism of the character described, the combination with a driving shaft, of driving means therefor, a plurality of trains of gears adapted to be selectively connected to the driving shaft, clutch mechanism for connecting and disconnecting said gears, a rod by which said clutch mechanism is carried, a movable coupling between the driving means and its shaft, a pivotally mounted arm for moving said coupling, a plurality of cams engaging said rod and said arm respectively, and means for rotating said cams whereby said rod is moved axially to operate said clutch and said arm is rocked to move said coupling out of engagement with said driving means during connection or disconnection of said gears.

In testimony whereof I hereunto affix my signature in the presence of two witnesses.

HANS GEORG KRAUSS.

Witnesses:
 PAUL DREY,
 ANDE OLEA.